(12) United States Patent
Bian et al.

(10) Patent No.: US 12,098,707 B2
(45) Date of Patent: Sep. 24, 2024

(54) FEEDFORWARD CONTROL METHOD, APPARATUS AND CONTROL SYSTEM FOR WIND TURBINE

(71) Applicant: BEIJING GOLDWIND SCIENCE & CREATION WINDPOWER EQUIPMENT CO., LTD., Beijing (CN)

(72) Inventors: Fengjiao Bian, Beijing (CN); Lei Liu, Beijing (CN); Mingyuan Jiang, Beijing (CN); Shigang Yao, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 99 days.

(21) Appl. No.: 17/615,095

(22) PCT Filed: Dec. 24, 2019

(86) PCT No.: PCT/CN2019/127920
§ 371 (c)(1),
(2) Date: Nov. 30, 2021

(87) PCT Pub. No.: WO2020/238182
PCT Pub. Date: Dec. 3, 2020

(65) Prior Publication Data
US 2022/0228557 A1    Jul. 21, 2022

(30) Foreign Application Priority Data
May 30, 2019   (CN) .......................... 201910462953.2

(51) Int. Cl.
F03D 7/04    (2006.01)

(52) U.S. Cl.
CPC .......... *F03D 7/043* (2013.01); *F05B 2270/32* (2013.01); *F05B 2270/321* (2013.01)

(58) Field of Classification Search
CPC ........ F03D 7/04; F03D 7/043; F05B 2270/32; F05B 2270/321; F05B 2270/404; F05B 2270/8042
See application file for complete search history.

(56) References Cited

U.S. PATENT DOCUMENTS

| | | | |
|---|---|---|---|
| 8,928,164 B2 * | 1/2015 | Bowyer | F03D 7/042 290/44 |
| 2007/0075546 A1 | 4/2007 | Avagliano et al. | |

(Continued)

FOREIGN PATENT DOCUMENTS

| | | |
|---|---|---|
| CN | 101368541 A | 2/2009 |
| CN | 102762852 A | 10/2012 |

(Continued)

OTHER PUBLICATIONS

The International Search Report mailed Mar. 13, 2020; PCT/CN2019/127920.

(Continued)

*Primary Examiner* — Christopher R Legendre
(74) *Attorney, Agent, or Firm* — Frank Gao, Esq.

(57) ABSTRACT

A feedforward control method includes: acquiring, by means of a remote sensing measurement apparatus, inflowing wind information of a plurality of spatial point positions in front of a wind turbine, wherein the plurality of spatial points are distributed in a plurality of different cross sections, and the distances between the plurality of different cross sections and the wind turbine are different; combining the acquired inflowing wind information into a target wind velocity; predicting, on the basis of the combined target wind velocity, incoming flow arrival time required for inflowing wind at a target point to arrive at an impeller plane; and performing (Continued)

feedforward control on the wind turbine according to the predicted incoming flow arrival time.

25 Claims, 6 Drawing Sheets

(56) References Cited

U.S. PATENT DOCUMENTS

| | | |
|---|---|---|
| 2009/0047116 A1 | 2/2009 | Barbu et al. |
| 2013/0062880 A1 | 3/2013 | Bowyer et al. |
| 2015/0147175 A1 | 5/2015 | Stoltenjohannes et al. |
| 2022/0228557 A1* | 7/2022 | Bian ............... F03D 7/043 |

FOREIGN PATENT DOCUMENTS

| | | |
|---|---|---|
| CN | 103061980 A | 4/2013 |
| CN | 104364522 A | 2/2015 |
| CN | 108953060 A | 12/2018 |
| EP | 1770278 A2 | 4/2007 |
| EP | 1 770 278 B1 | 6/2015 |
| EP | 3273055 A1 | 1/2018 |
| WO | 2010/061255 A2 | 6/2010 |
| WO | 2016/187405 A1 | 11/2016 |
| WO | 2018/234409 A1 | 12/2018 |

OTHER PUBLICATIONS

Wael Farag; et al; "A LIDAR-Based Pitch Control Strategy for Ultra Large Wind Turbines", 2017 Nineteenth International Middle East Power Systems Conference (MEPCON), Menoufia University, Egypt, Dec. 19-21, 2017; 8 pages.

David Schlipf, et al; "Comparison of Feedforward and Model Predictive Control of Wind Turbines Using LIDAR" 51st IEEE Conference on Decision and Control; Dec. 10-13, 2012; Maui, Hawaii USA; 6 pages.

The First Chinese Office Action dated Feb. 21, 2022; Appln. No. 201910462953.2.

Extended European Search Report dated Jul. 7, 2022; Appln. No. 19931285.1.

* cited by examiner a national stage of International Application No. PCT/CN2019/127920, filed on Dec. 24, 2019, which claims priority to Chinese Patent Application No. 201910462953.2, filed on May 30, 2019. Both of the aforementioned applications are hereby incorporated by reference in their entireties.

FIELD

This application relates to the technical field of wind power in general, and in particular, to a feedforward control method, apparatus and control system for a wind turbine.

BACKGROUND

With the development of technology, new remote sensing measurement devices have been gradually applied to the testing and control of a wind turbine. Due to the inevitable inductive effect in front of impeller, the actual wind speed reaching the impeller plane is not equal to the speed of the free incoming flow. The influence of the inductive effect and the speed attenuation rate reaching the impeller plane vary according to different wind speeds of the incoming flow. Under the influence of the inductive effect, when the incoming flow reaches to the impeller plane from different cross-sections, the wind speed does not change linearly, thus the wind speed of the incoming flow cannot be detected accurately.

Therefore, how to obtain accurate inflow wind information and strengthen the control of a large-scale wind turbine is one of key issues to be solved in the current wind power technology research and development process.

SUMMARY

A feedforward control method, apparatus and control system for a wind turbine are provided according to exemplary embodiments of this application, to overcome at least one of the aforementioned problems.

In one aspect, a feedforward control method for a wind turbine is provided. The feedforward control method includes: obtaining inflow wind information at multiple spatial point positions in front of the wind turbine through a remote sensing measurement device, where the multiple spatial point positions are distributed in multiple different cross-sections, and the multiple different cross-sections have different distances to the wind turbine; synthesizing the obtained inflow wind information into a target wind speed; predicting an incoming flow arrival time when inflow wind from a target point reaches to an impeller plane, based on the synthesized target wind speed; and performing a feedforward control on the wind turbine according to the predicted incoming flow arrival time.

In another aspect, a feedforward control device for a wind turbine is provided. The feedforward control device includes: an inflow wind information acquisition module configured to obtain inflow wind information at multiple spatial point positions in front of the wind turbine through a remote sensing measurement device, where the multiple spatial point positions are distributed in multiple different cross-sections, and the multiple different cross-sections have different distances to the wind turbine; a wind speed synthesis module configured to synthesize the obtained inflow wind information into a target wind speed; a time prediction module configured to predict an incoming flow arrival time when inflow wind from a target point reaches to an impeller plane, based on the synthesized target wind speed; and a feedforward control module configured to perform a feedforward control on the wind turbine according to the predicted incoming flow arrival time.

In another aspect, a controller of a wind turbine is provided. The controller includes: a processor, an input/output interface, and a memory for storing a computer program; where the computer program, when executed by the processor, implements the aforementioned feedforward control method for the wind turbine.

In another aspect, a control system for a wind turbine is provided. The control system includes: a remote sensing measurement device configured to detect inflow wind information at multiple spatial point positions in front of the wind turbine, where the multiple spatial point positions are distributed in multiple different cross-sections, and the multiple different cross-sections have different distances to the wind turbine; and a controller configured to obtain the inflow wind information at the multiple spatial point positions from the remote sensing measurement device, to realize the aforementioned feedforward control method for the wind turbine.

In another aspect, a computer-readable storage medium stored with a computer program is provided, and when the computer program is executed by a processor, the aforementioned feedforward control method for the wind turbine is implemented.

In the feedforward control method and device for a wind turbine, and the control system thereof according to embodiments of this application, the time of the inflow wind reaching the impeller plane can be accurately predicted based on an accurate wind speed, and the wind turbine is actively controlled, to reduce a load caused by the wind turbine suffering the uncertain inflow wind.

BRIEF DESCRIPTION OF THE DRAWINGS

To make the objectives, technical solutions, and advantages of the embodiments of this application clearer, the technical solutions in the embodiments of this application will be described clearly and completely hereinafter in conjunction with the drawings in the embodiments of this application.

DETAILED DESCRIPTION

Technical solutions in different illustrative embodiments will be described completely hereinafter in conjunction with accompanying drawings, and some illustrative embodiments are shown in the accompanying drawings.

Figure 1:
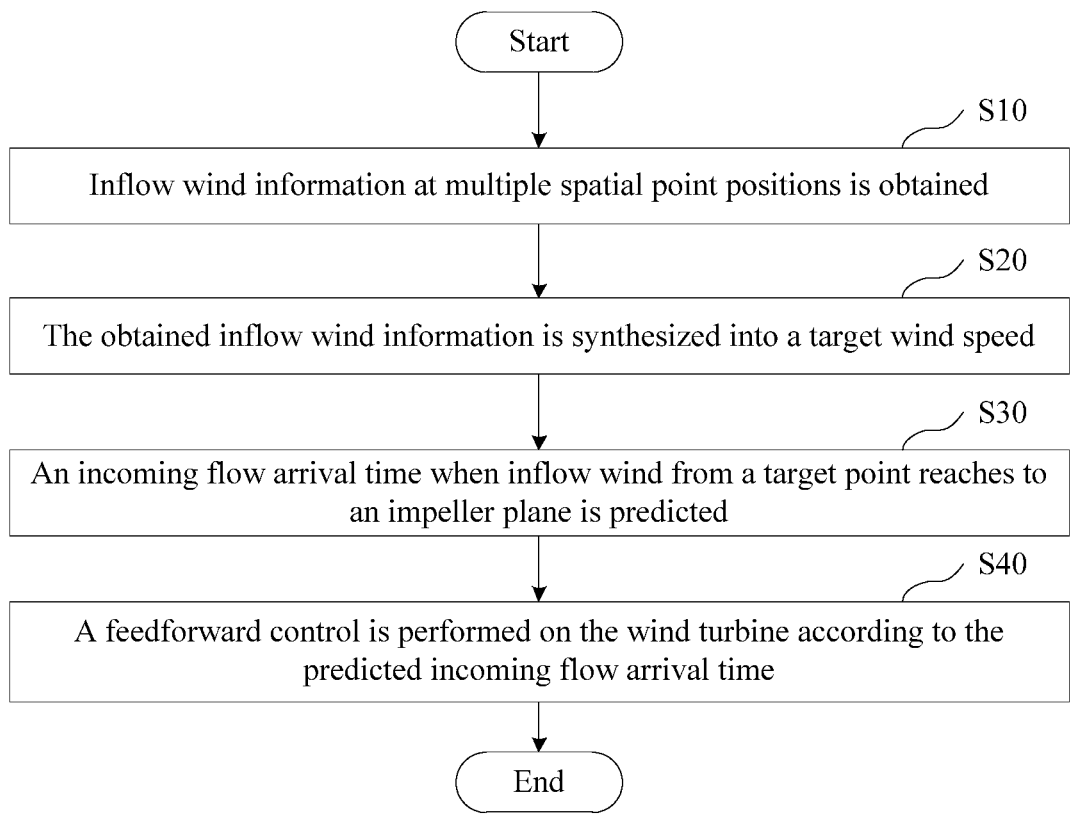
FIG. 1 is a flow chart of a feedforward control method for a wind turbine according to an exemplary embodiment of this application.

FIG. 1 is a flow chart of a feedforward control method for a wind turbine according to an exemplary embodiment of this application.

Referring to FIG. 1, in step S10, inflow wind information at multiple spatial point positions in front of the wind turbine is obtained through a remote sensing measurement device.

In one embodiment, the inflow wind information may include, but is not limited to, a wind speed of inflow wind at each of the multiple spatial point positions.

In one embodiment, a remote sensing measurement device may be provided on the top of a nacelle of the wind turbine, which is configured to detect inflow wind information at multiple spatial point positions. In this case, the inflow wind information at multiple spatial point positions in the aforementioned step S10 is obtained by the remote sensing measurement device.

The remote sensing measurement device may perform a non-contact and long-distance detection. As an example, the remote sensing measurement device may include, but is not limited to, a lidar. Alternatively, other devices, such as an ultrasonic wind measuring device, can also be used to detect the inflow wind information at the multiple spatial point positions.

The multiple spatial point positions are located in front of an impeller plane of the wind turbine (that is, a windward side). Taking the lidar as an example, a beam of the lidar is emitted toward the front of the impeller plane, to detect the inflow wind information at multiple spatial point positions in front of the impeller plane of the wind turbine.

Figure 2:
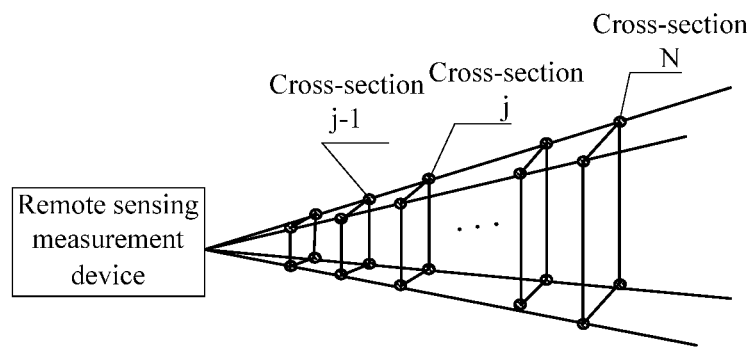
FIG. 2 is a schematic diagram illustrating a step of detecting inflow wind information at multiple spatial point positions through a remote sensing measurement device according to an exemplary embodiment of this application.

FIG. 2 is a schematic diagram illustrating a step of detecting inflow wind information at multiple spatial point positions through a remote sensing measurement device according to an exemplary embodiment of this application.

In the embodiment shown in FIG. 2, the remote sensing measurement device is a lidar as an example. It is assumed that the lidar emits four laser beams. The lidar can obtain inflow wind information at the multiple spatial point positions on each of the four laser beams based on the emitted laser beams.

One cross-section is formed by spatial points having the same distance to the lidar, and thus the lidar has multiple cross-sections. That is, multiple spatial points are distributed on multiple different cross-sections, and the multiple different cross-sections have different distances to the wind turbine. Each multiple cross-section may be parallel to the impeller plane by adjusting an installation angle of the lidar. A distance between one cross-section and the lidar refers to a detection distance, and a position of the cross-section N refers to a farthest distance that the lidar can detect.

Figure 3:
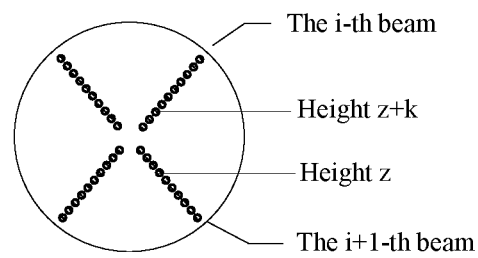
FIG. 3 is a schematic diagram of two-dimensional spatial distribution of inflow wind information detected at multiple spatial point positions by a remote sensing measurement device according to an exemplary embodiment of this application.

FIG. 3 is a schematic diagram of two-dimensional spatial distribution of inflow wind information detected at multiple spatial point positions by a remote sensing measurement device according to an exemplary embodiment of this application.

As shown in FIG. 3, for each beam emitted by the remote sensing measurement device, any spatial point positon on the beam includes not only a distance from the spatial point to the remote sensing measurement device (that is, a detection distance along a centerline of the beam), but also includes a height value of the spatial point (such as a height of z, or a height of z+k). The remote sensing measurement device can detect wind speeds of the inflow wind at all spatial points having different detection distances and different heights. The inflow wind information at each of the multiple spatial point positions detected by the remote sensing measurement device may include a wind speed of each of the multiple spatial point positions along a centerline direction of the beam and a wind speed of each of the multiple spatial point positions along a direction perpendicular to the centerline of the beam.

For example, the inflow wind information at any spatial point position may be expressed by a formula (1) in the following:

$$RAW_{i,j} = U_{i,j}\cos\theta_i + V_{i,j}\sin\theta_i\cos\varphi_i \tag{1}$$

where $RAW_{i,j}$ represents a wind speed of inflow wind of the i-th beam of a remote sensing measurement device at the j-th cross-section, $U_{i,j}$ represents a wind speed of the i-th beam at the j-th cross-section along a centerline direction of the i-th beam, and $V_{i,j}$ represents a wind speed of the i-th beam at the j-th cross-section along a direction perpendicular to the centerline of the i-th beam, $\theta_i$ represents a zenith angle of the i-th beam, and $\varphi_i$ represents an azimuth angle of the i-th beam with respect to a predetermined plane. The predetermined plane refers to a plane between an upper beam and a lower beam of the remote sensing measurement device. The zenith angle and the azimuth angle are both inherent parameters of the remote sensing measurement device.

In step S20, the obtained inflow wind information is synthesized into a target wind speed.

In front of the impeller of the wind turbine, there is an area where a wind speed is lower than a wind speed of an incoming flow due to obstruction of the impeller. This phenomenon is called inductive effect. The area where the wind speed is lowered due to the inductive effect is called an induced zone.

The existing wind measurement method by means of a remote sensing measurement device is susceptible to the inductive effect, resulting in inaccurate measurement of wind speeds. In an embodiment according to this application, a target wind speed is obtained by synthesizing a wind speed, therefore eliminating influence of the inductive effect on the wind speed, obtaining a more accurate inflow wind speed, and realizing precise control of the wind turbine based on the inflow wind speed. In other words, the synthesized target wind speed is an inflow wind speed that is not affected by the inductive effect.

It should be understood that various synthesis methods can be used to synthesize the inflow wind information at multiple spatial point positions into the target wind speed. The wind speed synthesis process described in the embodiments of this application is merely an example, and other wind speed synthesis algorithms may also be used to obtain the above-mentioned target wind speed, which is not limited by this application.

It can be seen from the above description that the remote sensing measurement device can emit multiple beams to detect the inflow wind information at different cross-sections. Based on this, in an embodiment of this application, it is proposed that a wind speed synthesis process is performed for each beam or for each cross-section. Various wind speed synthesis methods will be introduced separately hereinafter.

In a first embodiment, a wind speed synthesis process is performed for each cross-section of the remote sensing measurement device, to obtain the target wind speed.

In this case, for each cross-section, a cross-section average wind speed of the cross-section is determined according to the inflow wind information at each spatial point position of the cross-section, and the target wind speed is obtained based on cross-section average wind speeds of all cross-sections.

For example, a cross-section average wind speed of one cross-section may be an average value of inflow wind speeds at multiple spatial point positions of the cross-section. The cross-section average wind speed may also be calculated in other ways, which is not limited by this application. For example, a middle value of inflow wind speeds at multiple spatial point positions of the cross-section, or an average value of the maximum inflow wind speed and the minimum inflow wind speed at multiple spatial point positions of the cross-section may be selected as the cross-section average wind speed.

The method of obtaining the target wind speed based on the cross-section average wind speeds of all cross-sections will be exemplarily introduced hereinafter.

As an example, the target wind speed can be obtained according to cross-section average wind speeds of all cross-sections and inductive effect influence coefficients corresponding to respective cross-sections.

For each cross-section, a weight corresponding to the cross-section is set, and a ratio of a cross-section average wind speed to an inductive effect influence coefficient corresponding to the cross-section is calculated. A weighted sum of the ratios and the weight values corresponding to respective cross-sections is calculated and determined as the target wind speed.

Inductive effect influence coefficients corresponding to different cross-sections vary with the distances from spatial points to the impeller plane. As an example, the inductive effect influence coefficient corresponding to each cross-section may be determined in the following manner.

Specifically, a certain cross-section is selected from all cross-sections as a reference cross-section, and an inductive effect influence coefficient of the reference cross-section is set. The inductive effect influence coefficients of other reference cross-sections are obtained, by adjusting the inductive effect influence coefficient of the reference cross-section according to distances between the other cross-sections except the reference cross-section in all cross-sections and the reference cross-section.

The reference cross-section may be any one of all cross-sections. Specifically, the reference cross-section may be a cross-section at a position where the wind speed is least affected by the inductive effect among all the cross-sections.

For example, a position, that is least affected by the inductive effect, in front of the impeller plane of the wind turbine can be determined according to historical wind resource data of the wind turbine. A cross-section at the position (or a cross-section closest to the position) among all cross-sections is determined as the reference cross-section. The reference cross-section may also be selected in other ways, which is not limited by this application. For example, the reference cross-section may be selected from all cross-sections based on experience.

In an embodiment, the inductive effect influence coefficient corresponding to the reference cross-section may be set to 1, and the inductive effect influence coefficients corresponding to the other cross-sections may be obtained by adjusting the inductive effect influence coefficient of the reference cross-section according to distances between other cross-sections and the reference cross-section. For example, the inductive effect influence coefficients corresponding to other cross-sections gradually decrease from 1 as the distances between other cross-sections and the reference cross-section increase. As an example, an inductive effect influence coefficient corresponding to any other cross-section may be the reciprocal of a distance between the any other cross-section and the reference cross-section.

It should be understood that the above setting of the value of the inductive effect influence coefficient corresponding to the reference cross-section is merely an example, and those skilled in the art may set the inductive effect influence coefficient corresponding to the reference cross-section to other values according to actual requirements.

Alternatively, a machine learning algorithm may be utilized to determine an inductive effect influence coefficients corresponding to respective cross-sections based on historical wind resource data of the wind turbine.

For example, the historical wind resource data may include an actual inflow wind speed and a detected inflow wind speed at each cross-section. Data samples of the machine learning algorithm is constructed based on the historical wind resource data, and the inductive effect influence coefficients corresponding to respective cross-sections are obtained in the machine learning algorithm. It is understandable that the machine learning algorithm may include, but is not limited to, Extreme Learning Machine (ELM), and may also be other machine learning algorithms.

As an example, the target wind speed may also be obtained by eliminating time phase differences among average wind speeds of all cross-sections.

For example, an intermediate wind speed is obtained by synthesizing the cross-section average wind speeds of all cross-sections, to eliminate the time-phase differences among the cross-section average wind speeds of all cross-sections. The target wind speed is obtained according to the intermediate wind speed and a given inductive effect influence coefficient.

In an embodiment, the given inductive effect influence coefficient may be determined in the following manner.

For example, weights corresponding to respective cross-sections are set, and inductive effect influence coefficients corresponding to respective cross-sections are determined. A weighted sum of the inductive effect influence coefficients and the weights corresponding to respective cross-sections is calculated and determined as the given inductive effect influence coefficient.

The inductive effect influence coefficients corresponding to respective cross-sections may be obtained by adjusting the inductive effect influence coefficient of the reference cross-section as described above. It should be understood that the above-mentioned method of determining the given inductive effect influence coefficient in the embodiment of this application is merely an example, and the given inductive effect influence coefficient may also be determined in other ways, for example, the given inductive effect influence coefficient may be set based on experience.

As an example, the intermediate wind speed may be obtained in the following manner.

For each cross-section, an estimated wind speed when inflow wind reaches the designated cross-section from the cross-section is determined, according to a distance from the cross-section to the designated cross-section and a cross-section average wind speed of the cross-section. An average value of all estimated wind speeds is determined as the intermediate wind speed.

For example, the estimated wind speed when the inflow wind flows from any cross-section to a designated cross-section may be determined in the following way.

A flowing time required for the inflow wind to flow from a cross-section to the designated cross-section is calculated according to a distance from the cross-section to the designated cross-section and a cross-section average wind speed of the cross-section. A cross-section average wind speed of the designated cross-section determined after the flowing time is determined as the estimated wind speed when the inflow wind flows from the cross-section to the designated cross-section.

The above designated cross-section may be any one of all cross-sections. A ratio of the distance between the cross-section and the designated cross-section to the cross-section average wind speed of the cross-section may be determined as the flowing time required for the inflow wind to flow from the cross-section to the designated cross-section.

In the above method for synthesizing the intermediate wind speed by removing the time-phase differences of multiple cross-section average wind speeds, different inflow wind speeds at different cross-sections at any time and different flowing times required for the inflow wind to flow from different cross-sections to the impeller plane are considered. Assuming that the wind flow field is frozen, flowing time required for the inflow wind to flow within a distance between two adjacent cross-sections may be calculated based on the distance between the two adjacent cross-sections and the cross-section average wind speed.

In the embodiment of this application, the inflow wind information at each spatial point position is acquired in real time, and the cross-section average wind speed of each cross-section is calculated in real time. When the inflow wind flows to the designated cross-section after the flowing time, the inflow wind speed at each spatial point position is obtained according to a sampling frequency of the remote sensing measurement device. The cross-section average wind speed of the designated cross-section calculated at this time is determined as the estimated wind speed. The average value of the estimated wind speeds when the inflow wind flows reach the designated cross-section from each cross-section is determined as the intermediate wind speed.

In a second embodiment, a wind speed synthesis process is performed for each beam emitted by the lidar, to obtain the target wind speed.

In this case, for each beam emitted by the lidar, a beam synthesized wind speed of the beam is determined according to inflow wind information at multiple spatial point positions on the beam and inductive effect influence coefficients corresponding to the multiple spatial point positions. An average value of beam synthesized wind speeds of all beams is determined as the target wind speed.

In an embodiment, the beam synthesized wind speed can be determined, by setting weights for respective spatial point positions, calculating ratios of inflow wind information at spatial point positions on the beam to corresponding inductive effect influence coefficients, calculating a weighted sum of the ratios and the corresponding weights as the beam synthesized wind speed.

The inductive effect influence coefficient corresponding to each spatial point position may be determined according to the aforementioned method of determining the inductive effect influence coefficient corresponding to each cross-section.

In an exemplary embodiment of this application, the target wind speed may also be obtained based on a wind speed fitting curve, in addition to the wind speed synthesis method performed for each beam or each cross-section.

It should be understood that for other types of remote sensing measurement devices other than the lidar, such as an ultrasonic wind measurement device, the wind speed synthesis process may be performed based on a beam of ultrasonic waves emitted by the ultrasonic wind measurement device.

In a third embodiment, the target wind speed may be obtained, based on a wind speed fitting curve of inflow wind information at multiple spatial point positions.

In this case, the wind speed curve of the inflow wind flowing from a target point to the impeller plane is obtained according to the obtained inflow wind information at multiple spatial point positions. The obtained wind speed curve is integrated. A ratio of an integral area to a distance between the target point and the impeller plane is determined as the target wind speed.

Figure 4:
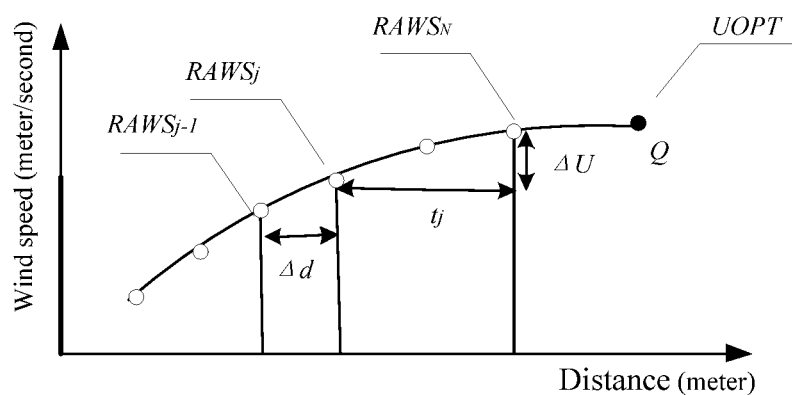
FIG. 4 is a schematic diagram of a wind speed curve according to an exemplary embodiment of this application.

FIG. 4 is a schematic diagram of a wind speed curve according to an exemplary embodiment of this application.

It should be understood that the target point may be any point within a finite distance to the impeller plane. For example, the target point may be an inflow point within a finite distance to the impeller plane without the influence of inductive effects (for example, a point Q shown in FIG. 4). The target wind speed may be defined as the inflow wind speed at the target point.

After the inflow wind information at multiple spatial point positions is obtained, various fitting, filtering, and smoothing methods may be utilized to obtain the wind speed curve of the inflow wind from the target point to the impeller plane (that is, a smooth wind speed curve). The target wind speed is determined based on the wind speed curve. The various fitting, filtering, and smoothing methods are common knowledge in the art, which will not be described in this application.

In an embodiment, different calculation methods may be selected based on the locations of the target points to determine the target wind speed.

In an exemplary embodiment of this application, Taylor's hypothesis is introduced. It is assumed that a wind flow domain in front of the impeller plane is frozen. If a location $x_{OPT}$ of the target point Q (i.e., a distance between the target point Q and the impeller plane of the wind turbine) is greater than or equal to the farthest detection distance $D(N)$ of the remote sensing measurement device, a following formula (2) may be used to calculate the target wind speed.

$$U_{OFT} = \frac{1}{n}\sum_{j=1}^{n} RAWS_j\left(t_m - \frac{x_{OFT} - x_j}{u_j}\right) \quad (2)$$

In the formula (2), $U_{OPT}$ represents a target wind speed; $RAWS_j$ represents a cross-section average wind speed at the j-th cross-section of a remote sensing measurement device; $X_{OPT}$ represents a distance from a target point to an impeller plane; $x_j$ represents a distance from the j-th cross-section to the impeller plane, where $1 \leq j \leq n$; n represents the number of cross-sections for calculating the target wind speed; $t_m$ represents a flowing time required for inflow wind to flow from the target point to the impeller plane; and $\overline{u}_j$ represents an average wind speed of the inflow wind flowing from the j-th cross-section to an adjacent (j−1)-th cross-section.

If the location of the target point Q is smaller than the farthest detection distance D(N) of the remote sensing measurement device, a following formula (3) may be used to calculate the target wind speed.

$$U_{OPT} = \frac{1}{n}\sum_{j=1}^{p} RAWS_j \left( t_m - \frac{x_{OPT} - x_j}{\overline{u}_j} \right) + \frac{1}{n}\sum_{j=p+1}^{n} RAWS_j \left( t_m - \frac{x_j - x_{OPT}}{\overline{u}_j} \right) \quad (3)$$

In an exemplary embodiment of this application, the p-th cross-section in formula (3) refers to a cross-section, which is located between the target point and the impeller plane and has a distance closest to the target point among the multiple cross-sections. It is assumed that a cross-section closest to the remote sensing measurement device (that is, j=1) is the first cross-section.

The wind speed in the above formula (2) and formula (3) may be obtained by removing time-phase differences of cross-section average wind speeds of all cross-sections, and then performing an average calculation. In this way, the target wind speed that is not affected by the inductive effect can be obtained.

The average wind speed $\overline{u}_j$ in the above formula may be obtained by the wind speed curve shown in FIG. 4. For example, the wind speed curve from the j-th cross-section to the adjacent (j−1)-th cross-section is integrated, and a ratio of an integral area of the wind speed curve to a distance difference $\Delta d$ between the two cross-sections is determined as the average wind speed $\overline{u}_1$. In FIG. 4, $\Delta U$ represents a difference between cross-section average wind speeds of the two cross-sections, and $t_j$ represents a flowing time required for the inflow wind to flow from the N-th cross-section to the j-th cross-section.

In an exemplary embodiment of this application, the target wind speed that is not affected by the inductive effect is obtained by synthesizing the inflow wind information at multiple spatial point positions, according to influence rules of vertical wind shearing effect, horizontal wind shearing effect and inductive effect on wind flow field in front of the impeller. The target wind speed that is not affected by the inductive effect may be used for active control and evaluation of the wind turbine.

Referring to FIG. 1, in step S30, an incoming flow arrival time when inflow wind from a target point reaches to an impeller plane is predicted based on the synthesized target wind speed.

In an embodiment of this application, Taylor's hypothesis is introduced in a prediction process of the incoming flow arrival time, which assuming that the wind flow domain in front of the impeller plane is frozen. The incoming flow arrival time is predicted according to a synthesized target wind speed under this premise.

Optionally, the incoming flow arrival time may be predicted in following four ways.

In the first way, the incoming flow arrival time is predicted based on the target wind speed and a distance from a position of the target point to the impeller plane.

For example, the incoming flow arrival time is determined based on a ratio of the distance between the position of the target point and the impeller plane to the target wind speed.

In the second way, the incoming flow arrival time is predicted based on the wind speed curve and the target wind speed.

In the case that the target wind speed is obtained based on the wind speed curve of the inflow wind information at multiple spatial point positions, the wind speed curve from the target point to the impeller plane is integrated, and a ratio of an integral area to the target wind speed is determined as the incoming flow arrival time required for the inflow wind to reach the impeller plane from the target point.

In the third way, the incoming flow arrival time required for the inflow wind to reach the impeller plane from the target point is predicted based on a corresponding relationship between the target wind speed and the incoming flow arrival time.

For example, a correspondence relationship between the target wind speed and a flowing time required for the inflow wind at the target point to reach the impeller plane is established in advance, by using a deep learning method based on historical wind resource data of the wind turbine. After the target wind speed is synthesized, a flowing time corresponding to the synthesized target wind speed may be searched according to the correspondence relationship established in advance. The searched flowing time is determined as the incoming flow arrival time. The target wind speed and the flowing time used to establish the correspondence relationship may be obtained by using the aforementioned method in the exemplary embodiment of this application.

In the fourth way, the incoming flow arrival time required for the inflow wind at the target point to reach the impeller plane is predicted by calculating the incoming flow arrival time in sections.

For example, the first flowing time required for the inflow wind to flow from a predetermined cross-section to a designated cross-section, and the second flowing time required for the inflow wind to flow from the designated cross-section to the impeller plane are calculated respectively. A sum of the first flowing time and the second flowing time is determined as the incoming flow arrival time required for the inflow wind at the target point to reach the impeller plane. The predetermined cross-section has a distance to the impeller plane greater than a distance from the designated cross-section to the impeller plane.

As an example, the incoming flow arrival time required for the inflow wind at the target point to reach the impeller plane may be predicted by the following formula (4).

$$t_{OPT} = \sum_{b=1}^{c} t_b + t_a \quad (4)$$

In the formula (4), $t_{OPT}$ represents the incoming flow arrival time required for the inflow wind at the target point to reach the impeller plane, $t_b$ represents the first flowing time required for the inflow wind to flow from the b-th predetermined cross-section to the designated cross-section a, $t_a$ represents the second flowing time required for the inflow wind to flow from the designated cross-section a to the impeller plane, and c represents the number of the predetermined cross-sections.

A ratio of a distance between the b-th cross-section and the designated cross-section a to a cross-section average wind speed of the b-th cross-section may be determined as the first flowing time $t_b$. Alternatively, the wind speed curve from the b-th cross-section to the designated cross-section a is integrated, and a ratio of the integral area to the cross-section average wind speed of the b-th cross-section is determined as the first flowing time $t_b$.

Correspondingly, a ratio of a distance between the designated cross-section a and the impeller plane to a cross-section average wind speed of the designated cross-section a may be determined as the second flowing time $t_a$. Alternatively, the wind speed curve from the designated cross-section a to the impeller plane is integrated, and a ratio of the integral area to the cross-section average wind speed of the designated cross-section a is determined as the second flowing time $t_a$.

If the location of the target point Q is smaller than or equal to the farthest detection distance D(N) of the remote sensing measurement device, the above formula (4) may be used to calculate the incoming flow arrival time. If the location of the target point Q is greater than the farthest detection distance D(N) of the remote sensing measurement device, the value of $t_{OPT}$ in the above formula (4) includes the third flowing time $t_d$ in addition to the aforementioned first flowing time $t_b$ and second flowing time $t_a$. The third flowing time $t_d$ refers to a flowing time required for the inflow wind to flow from the target point to the farthest detection distance D(N). For example, the third flowing time $t_d$ may be determined by a ratio of the distance between the target point and the farthest detection distance D(N) and a cross-section average wind speed of a cross-section at the farthest detection distance D(N).

It should be understood that the method of predicting the incoming flow arrival time based on the target wind speed described in the embodiment of this application is merely an example, and the incoming flow arrival time may also be predicted in other ways.

In step S40, a feedforward control is performed on the wind turbine according to the predicted incoming flow arrival time.

Through the above steps, the target wind speed of the shearing inflow wind outside an inductive zone is accurately calculated, so as to perform a feedforward control on the wind turbine when the inflow wind arrives.

Figure 5:
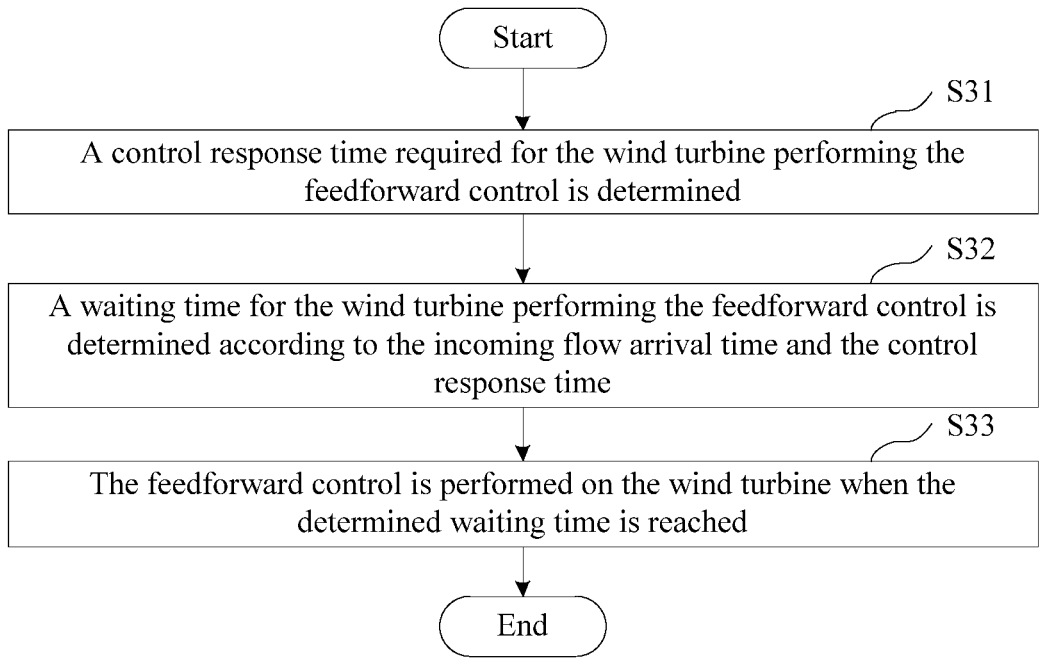
FIG. 5 is a flow chart of steps of performing a feedforward control on the wind turbine based on a predicted incoming flow arrival time according to an exemplary embodiment of this application.

In an embodiment, a method shown in FIG. 5 may be used to perform the feedforward control on the wind turbine. FIG. 5 is a flow chart of steps of performing a feedforward control on the wind turbine according to the arrival time of the inflow wind according to an exemplary embodiment of this application.

Referring to FIG. 5, in step S31, a control response time required for the wind turbine performing the feedforward control is determined.

For example, a time required for performing the feedforward control on the wind turbine once in the history may be used as the control response time. Alternatively, the control response time required for the wind turbine performing the feedforward control may also be set based on experience.

In step S32, a waiting time for the wind turbine performing the feedforward control is determined according to the predicted incoming flow arrival time and the determined control response time.

A difference between the predicted incoming flow arrival time and the determined control response time may be determined as the waiting time for the wind turbine executing the feedforward control.

In step S33, the feedforward control is performed on the wind turbine when the determined waiting time is reached.

It should be understood that the step of performing a feedforward control on the wind turbine according to the incoming flow arrival time shown in FIG. 5 is merely an example, which will not be limited herein. Other ways for performing the feedforward control on the wind turbine based on the incoming flow arrival time may also be applied, for example, the feedforward control may be performed on the wind turbine when the predicted incoming flow arrival time is reached.

Figure 6:
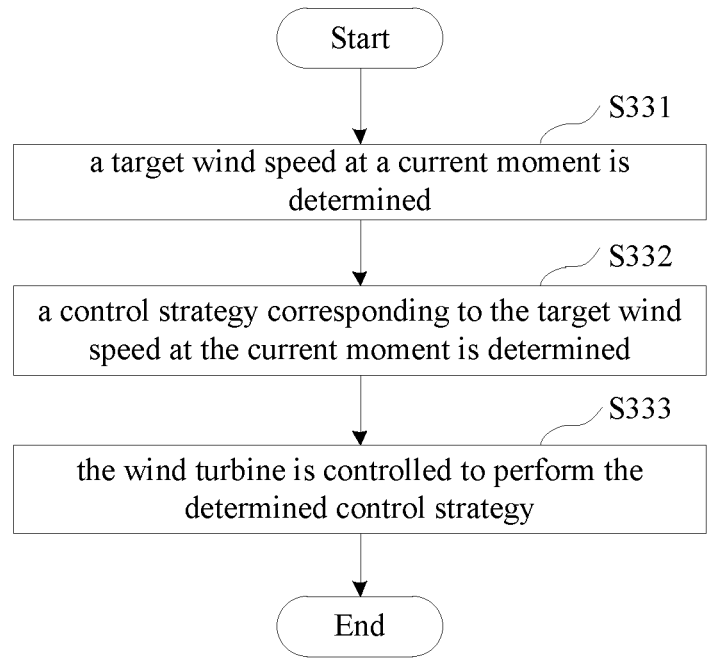
FIG. 6 is a flow chart of steps of performing a feedforward control on the wind turbine according to an exemplary embodiment of this application.

FIG. 6 is a flow chart of steps of performing a feedforward control on the wind turbine according to an exemplary embodiment of this application.

In step S331, a target wind speed at a current moment is determined when the waiting time is reached.

In an exemplary embodiment of this application, inflow wind information at each spatial point position is obtained in real time, and the synthesized target wind speed is calculated in real time. In this case, at the current moment when the waiting time is reached, the target wind speed at this current moment is obtained.

In step S332, a control strategy corresponding to the target wind speed at the current moment is determined.

In an embodiment, wind speeds and control strategies corresponding to the wind speeds are stored in a control strategy table. In this case, a control strategy corresponding to the target wind speed at the current moment may be searched out from the control strategy table.

It should be understood that the above step of determining the control strategy corresponding to the target wind speed based on the control strategy table is merely an example, and the control strategy corresponding to the target wind speed may also be determined in other ways, which is not limited by this application.

In step S333, the wind turbine is controlled to perform the determined control strategy.

In an embodiment, in the feedforward control method for the wind turbine according to an exemplary embodiment of this application, in addition to the target wind speed that is not affected by the inductive effect, a target wind direction (which may refer to a wind direction of the inflow wind), target turbulence intensity, and a target wind shear factor that are not affected by the inductive effect may also be obtained.

In an embodiment, the feedforward control method for the wind turbine according to an embodiment of this application may further include: determining a target wind shear factor, a target wind direction, and/or target turbulence intensity based on the inflow wind information at multiple spatial point positions.

In this case, when the waiting time is reached, in addition to the target wind speed at the current moment, a target wind shear factor, a target wind direction and/or target turbulence intensity at the current moment may also be determined. At this time, the control strategy executed by the wind turbine may correspond to the target wind speed and at least one of the target wind shear factor, the target wind direction and the target turbulence intensity at the current moment.

In this case, wind resource parameters and control strategies corresponding to the wind resource parameters may be stored into the control strategy table. The wind resource parameters include the wind speed, and at least one of a wind shear factor, a wind direction and turbulence intensity.

As an example, the control strategy may include, but is not limited to, at least one control strategy for the following control items: yaw control, pitch control, load reduction control, shutdown control, and torque adjustment control of the wind turbine.

Control parameters, such as a yaw angle and pitch angle, corresponding to the control strategy may be stored in the control strategy of the control strategy table. In this case, the control parameter under the control strategy corresponding to the wind resource parameter at the current moment is searched out from the control strategy table, and is sent to the wind turbine. The wind turbine is controlled to operate based on the control parameter. In addition to the above control method, predetermined parameters (such as power generation) of the wind turbine may also be calculated. For example, the power generation of the wind turbine may be evaluated based on the target wind shear factor, the target wind direction, the target turbulence intensity, and/or the target wind speed.

As an example, a control strategy corresponding to the target wind speed includes: perform a pitch control on the wind turbine. A control strategy corresponding to the target wind speed and target wind direction includes: perform a yaw control and a shutdown control on the wind turbine. A control strategy corresponding to the target turbulence intensity includes: perform a torque adjustment control on the wind turbine. It should be understood that the corresponding relationship between the wind resource parameters and the control strategy listed above is merely an example, and those skilled in the art can establish a control strategy table according to actual requirements, which is not limited by this application.

Through the aforementioned feedforward control method, the wind turbine will respond "in time" through active control, therefore realizing a target of "in response to the wind and in response to the trend".

In an embodiment, the obtained inflow wind information at multiple spatial point positions may include first inflow wind information and second inflow wind information. For example, the first inflow wind information may include inflow wind information at each spatial point position above a plane where a centerline of beams emitted by the remote sensing measurement device is located. The second inflow wind information may include inflow wind information at each spatial point position below the plane where the centerline of the beams emitted by the remote sensing measurement device is located.

A process for determining the target wind shear factor, a process for determining the target wind direction, and a process for determining the target turbulence intensity are described hereinafter.

Steps for calculating a target wind shear factor based on the inflow wind information at multiple spatial point positions are described in conjunction with FIG. 7 hereinafter.

Figure 7:
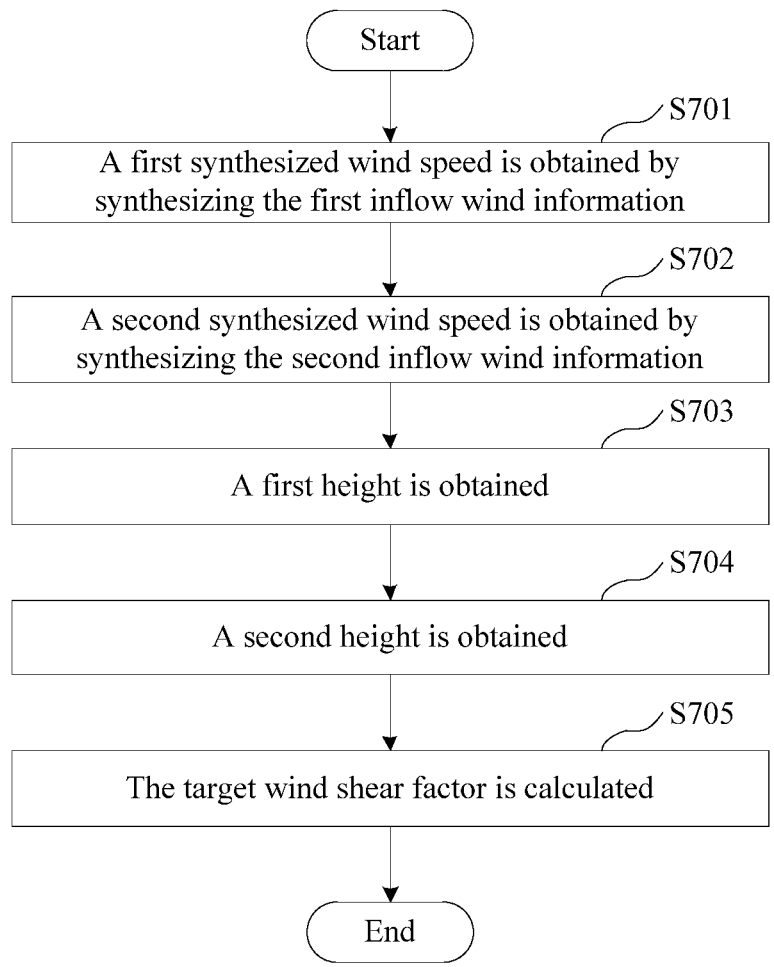
FIG. 7 is a flow chart of steps of calculating a target wind shear factor according to an exemplary embodiment of this application.

FIG. 7 is a flow chart of steps of calculating a target wind shear factor according to an exemplary embodiment of this application.

As shown in FIG. 7, in step S701, a first synthesized wind speed is obtained by synthesizing the first inflow wind information.

For example, an average value of wind speeds of the inflow wind at multiple spatial point positions above the plane where the centerline of the beams emitted by the remote sensing measurement device is located may be determined as the first synthesized wind speed. The first synthesized wind speed may also be obtained in other ways, which is not limited by this application.

In step S702, a second synthesized wind speed is obtained by synthesizing the second inflow wind information.

For example, an average value of wind speeds of the inflow wind at multiple spatial point positions below the plane where the centerline of the beams emitted by the remote sensing measurement device is located may be determined as the second synthesized wind speed. The second synthesized wind speed may also be obtained in other ways, which is not limited by this application.

In step S703, an average value of heights of multiple spatial point positions above the plane where the centerline of the beams emitted by the remote sensing measurement device is located is calculated, to obtain a first height.

The inflow wind information at multiple spatial point positions may also include height of each spatial point position. The average value of heights of multiple spatial point positions above the plane where the centerline of the beams emitted by the remote sensing measurement device is located is calculated and determined as the first height.

In step S704, an average value of heights of multiple spatial point positions below the plane where the centerline of the beams emitted by the remote sensing measurement device is located is calculated, to obtain a second height.

In step S705, the target wind shear factor is calculated according to the first synthesized wind speed, the second synthesized wind speed, the first height and the second height.

As an example, the target wind shear factor is calculated according to the following formula (5).

$$V_{Shear} = \frac{\ln\left(\frac{HWS_+}{HWS_-}\right)}{\ln\left(\frac{H_+}{H_-}\right)} \quad (5)$$

In the formula (5), $V_{Shear}$ represents the target wind shear factor (that is, a vertical wind shear factor), $HWS_+$ represents the first synthesized wind speed, $HWS_-$ represents the second synthesized wind speed, $H_+$ represents the first height, and $H_-$ represents the second height.

It should be understood that in above process, a target wind shear factor for multiple spatial point positions is calculated, but this application is not limited to this. A wind shear factor for each cross-section may be calculated. In this case, the target wind shear factor includes wind shear factors corresponding to respective cross-sections. As an example, the wind shear factor corresponding to one cross-section may be calculated based on the inflow wind information at multiple spatial point positions at the cross-section by utilizing the above formula (5).

Steps for calculating a target wind direction based on the inflow wind information at multiple spatial point positions are described in conjunction with FIG. 8 hereinafter.

Figure 8:
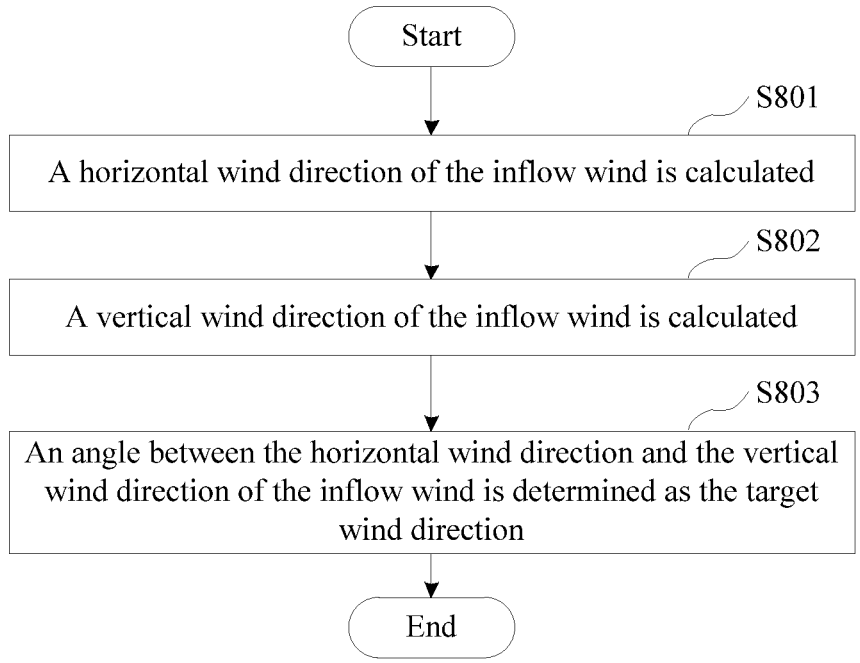
FIG. 8 is a flow chart of steps of determining a target wind direction according to an exemplary embodiment of this application.

FIG. 8 is a flow chart of steps of determining a target wind direction according to an exemplary embodiment of this application.

Referring to FIG. 8, in step S801, a horizontal wind direction of the inflow wind is calculated according to the first inflow wind information, the second inflow wind information, and a zenith angle of each beam emitted by the remote sensing measurement device.

As an example, the horizontal wind direction of the inflow wind is calculated according to the following formula (6).

$$U_+ = \frac{\overline{RWS_0} + \overline{RWS_1}}{2\cos\theta} \quad (6)$$

In the formula (6), $U_+$ represents a horizontal wind direction of the inflow wind, $\overline{RWS_0}$ represents an average wind speed of the inflow wind at multiple spatial points above the plane where the centerline of the beams emitted by the remote sensing measurement device is located, $\overline{RWS_1}$ represents an average wind speed of the inflow wind at multiple spatial points below the plane where the centerline of the beams emitted by the remote sensing measurement device is located, and θ represents an average value of zenith angles of all beams.

In step S802, a vertical wind direction of the inflow wind is calculated according to the first inflow wind information, the second inflow wind information, the zenith angle of each beam emitted by the remote sensing measurement device, and an azimuth angle of each beam emitted by the remote sensing measurement device relative to the plane where the centerline of the beams is located.

As an example, the vertical wind direction of the inflow wind is calculated according to the following formula (7).

$$V_+ = \frac{\overline{RWS_0} - \overline{RWS_1}}{2\sin\theta + \cos\varphi} \quad (7)$$

In the formula (7), $V_+$ represents a vertical wind direction of the inflow wind, and φ represents an average value of azimuth angles of all beams relative to a predetermined plane.

In step S803, an angle between the horizontal wind direction and the vertical wind direction of the inflow wind is determined as the target wind direction.

As an example, the target wind direction of the inflow wind is calculated according to the following formula (8).

$$\Omega_+ = a\tan2(U_+; V_+) \quad (8)$$

In the formula (8), $\Omega_+$ represents a target wind direction, and atan 2( ) represents a function for calculating an angle between the horizontal wind direction and the vertical wind direction of the inflow wind.

Steps of determining target turbulence intensity based on the inflow wind information at multiple spatial point positions are described hereinafter.

For example, the target turbulence intensity may be obtained by the following steps: synthesizing the inflow wind information into a target wind speed; calculating a wind speed standard deviation of the target wind speed within a predetermined time period and an average wind speed of the target wind speed within the predetermined time period; and determining a ratio of the wind speed standard deviation to the average wind speed as the target turbulence intensity.

It should be understood that in the above process, the target turbulence intensity for the multiple spatial point positions is calculated, but this application is not limited to this. Furthermore, turbulence intensity for each cross-section may also be calculated. In this case, the target turbulence intensity includes the turbulence intensity corresponding to each cross-section. As an example, turbulence intensity corresponding to one cross-section is calculated by the above method based on the inflow wind information at multiple spatial point positions of the cross-section.

It should be understood that the above methods for determining the target wind direction, the target wind shear factor, and the target turbulence intensity are merely examples, and this application is not limited to this. The target wind direction, the target wind shear factor, and the target turbulence intensity may also be determined in other ways.

Figure 9:
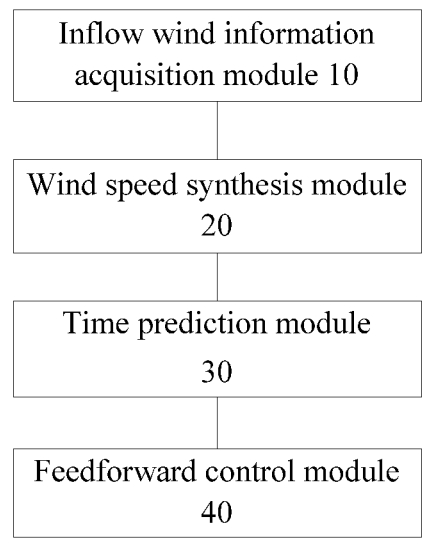
FIG. 9 is a block diagram of a feedforward control device for a wind turbine according to an exemplary embodiment of this application.

FIG. 9 is a block diagram of a feedforward control device for a wind turbine according to an exemplary embodiment of this application.

As shown in FIG. 9, the feedforward control device for a wind turbine according to the exemplary embodiment of this application includes: an inflow wind information acquisition module 10, a wind speed synthesis module 20, a time prediction module 30, and a feedforward control module 40.

The inflow wind information acquisition module 10 is configured to obtain inflow wind information at multiple spatial point positions in front of the wind turbine through a remote sensing measurement device. The multiple spatial point positions are distributed in multiple different cross-sections, and the multiple different cross-sections have different distances to the wind turbine. As an example, the inflow wind information includes, but is not limited to, inflow wind speeds at the multiple spatial point positions.

In an embodiment, a remote sensing measurement device may be provided on the top of a nacelle of the wind turbine, which is configured to detect inflow wind information at multiple spatial point positions. In this case, the inflow wind information acquisition module 10 obtains the inflow wind information at multiple spatial point positions. As an example, the remote sensing measurement device includes, but is not limited to, a lidar.

The wind speed synthesis module 20 is configured to synthesize the obtained inflow wind information into a target wind speed.

In an embodiment of this application, the wind speed synthesis module 20 may perform a wind speed synthesis process for each beam or for each cross-section. Various wind speed synthesis methods will be introduced separately hereinafter.

In a first embodiment, the wind speed synthesis module 20 performs a wind speed synthesis process based on each cross-section of the remote sensing measurement device, to obtain the target wind speed.

In this case, the wind speed synthesis module 20 is configured to: for each cross-section, determine a cross-section average wind speed of the cross-section according to the inflow wind information at each spatial point position of the cross-section; and obtain the target wind speed based on cross-section average wind speeds of all cross-sections.

For example, a cross-section average wind speed of one cross-section may be an average value of wind speeds of inflow wind at multiple spatial point positions of the cross-section.

Two ways of obtaining the target wind speed based on the cross-section average wind speed of each cross-section will be exemplarily introduced hereinafter.

In one embodiment, the wind speed synthesis module 20 is configured to obtain the target wind speed according to cross-section average wind speeds of all cross-sections and inductive effect influence coefficients corresponding to respective cross-sections.

For example, the wind speed synthesis module 20 is configured to: for each cross-section, set a weight corresponding to the cross-section, and calculate a ratio of a cross-section average wind speed to an inductive effect influence coefficient corresponding to the cross-section; calculate a weighted sum of the ratios and the weights corresponding to respective cross-sections; and determine the weighted sum as the target wind speed.

As an example, the wind speed synthesis module 20 determines the inductive effect influence coefficients corresponding to the respective cross-sections in the following manner.

Specifically, a certain cross-section is selected from all cross-sections as a reference cross-section, and an inductive effect influence coefficient of the reference cross-section is set. The inductive effect influence coefficients of other reference cross-sections are obtained, by adjusting the inductive effect influence coefficient of the reference cross-section according to distances between the other cross-sections except the reference cross-section in all cross-sections and the reference cross-section.

As an example, the reference cross-section may be any one of all cross-sections. Specifically, the reference cross-section may be a cross-section at a position where the wind speed is least affected by the inductive effect among all the cross-sections.

In another embodiment, the wind speed synthesis module 20 may obtain the target wind speed by eliminating time phase differences among average wind speeds of all cross-sections.

For example, the wind speed synthesis module 20 is configured to obtain an intermediate wind speed by synthesizing the cross-section average wind speeds of all cross-sections, to eliminate the time phase differences among the cross-section average wind speeds of all cross-sections; and obtain the target wind speed according to the intermediate wind speed and a given inductive effect influence coefficient.

In an embodiment, the wind speed synthesis module 20 may determine the given inductive effect influence coefficient in the following manner.

For example, weights corresponding to respective cross-sections are set, and inductive effect influence coefficients corresponding to the respective cross-sections are determined. A weighted sum of the inductive effect influence coefficients and the weights corresponding to the respective cross-sections is calculated and determined as the given inductive effect influence coefficient.

As an example, the wind speed synthesis module 20 may obtain the intermediate wind speed in the following manner.

For each cross-section, an estimated wind speed when inflow wind reaches the designated cross-section from the cross-section is determined, according to a distance from the cross-section to the designated cross-section and a cross-section average wind speed of the cross-section. An average value of all estimated wind speeds is determined as the intermediate wind speed.

For example, the wind speed synthesis module 20 may determine the estimated wind speed when the inflow wind reaches the designated cross-section from any cross-section in the following way.

A flowing time required for the inflow wind to flow from a cross-section to the designated cross-section is calculated according to a distance from the cross-section to the designated cross-section and a cross-section average wind speed of the cross-section. A cross-section average wind speed of the designated cross-section determined after the flowing time is determined as the estimated wind speed when the inflow wind reaches the designated cross-section from the cross-section.

In a second embodiment, the wind speed synthesis module 20 performs a wind speed synthesis process for each beam emitted by a lidar, to obtain the target wind speed.

In this case, the wind speed synthesis module 20, for each beam emitted by the lidar, determines a beam synthesized wind speed of the beam according to inflow wind information at multiple spatial point positions on the beam and inductive effect influence coefficients corresponding to the multiple spatial point positions; and determines an average value of beam synthesized wind speeds of all beams as the target wind speed.

The wind speed synthesis module 20 may determine the beam synthesized wind speed of the beam, by setting weights for respective spatial point positions, calculating ratios of inflow wind information at spatial point positions on the beam to corresponding inductive effect influence coefficients, calculating a weighted sum of the ratios and the corresponding weights as the beam synthesized wind speed.

In an exemplary embodiment of this application, the target wind speed may also be obtained based on a wind speed fitting curve, beside the wind speed synthesis method performed for all beams or all cross-sections.

In a third embodiment, the wind speed synthesis module 20 is configured to obtain the target wind speed based on a wind speed fitting curve of inflow wind information at multiple spatial point positions.

In this case, the wind speed synthesis module 20 is configured to: obtain a wind speed curve of the inflow wind flowing from a target point to the impeller plane according to the inflow wind information at multiple spatial point positions, integrate the wind speed curve, and determine a ratio of an integral area to a distance between the target point and the impeller plane as the target wind speed.

The time prediction module 30 is configured to predict an incoming flow arrival time when inflow wind from a target point reaches an impeller plane, based on the synthesized target wind speed.

In the first way, the time prediction module 30 predicted the incoming flow arrival time based on the target wind speed and a distance between a position of the target point and the impeller plane.

For example, the time prediction module 30 may determine the incoming flow arrival time, based on a ratio of the distance between the position of the target point and the impeller plane to the target wind speed.

In the second way, the time prediction module 30 predicts the incoming flow arrival time based on the wind speed curve and the target wind speed.

In the case that the target wind speed is obtained based on the wind speed curve of the inflow wind information at multiple spatial point positions, the time prediction module 30 calculates an integration of the wind speed curve from the target point to the impeller plane, and determines a ratio of an integral area to the target wind speed as the incoming flow arrival time required for the inflow wind to reach the impeller plane from the target point.

In the third way, the time prediction module 30 predicts the incoming flow arrival time required for the inflow wind to reach the impeller plane from the target point, based on a corresponding relationship between the target wind speed and the incoming flow arrival time.

For example, the time prediction module 30 may establish in advance a correspondence relationship between the target wind speed and a flowing time required for the inflow wind at the target point to reach the impeller plane.

After the wind speed synthesis module 20 obtains the target wind speed, the time prediction module 30 may search a flowing time corresponding to the target wind speed according to the correspondence relationship established in advance, and determines the searched flowing time as the incoming flow arrival time.

In the fourth way, the time prediction module 30 predicts the incoming flow arrival time required for the inflow wind at the target point to reach the impeller plane, by calculating the incoming flow arrival time in sections.

For example, the time prediction module 30 calculates a first flowing time required for the inflow wind to flow from a predetermined cross-section to a designated cross-section, calculates a second flowing time required for the inflow wind to flow from the designated cross-section to the impeller plane, and determines a sum of the first flowing time and the second flowing time as the incoming flow arrival time required for the inflow wind at the target point to reach the impeller plane. The predetermined cross-section has a distance to the impeller plane greater than a distance from the designated cross-section to the impeller plane.

The feedforward control module 40 performs a feedforward control process on the wind turbine according to the incoming flow arrival time.

For example, the feedforward control module 40 may determine a control response time required for the wind turbine performing a feedforward control; determine a waiting time for the wind turbine executing the feedforward control, according to the predicted incoming flow arrival time and the determined control response time; and perform the feedforward control on the wind turbine when the determined waiting time is reached.

A difference between the predicted incoming flow arrival time and the determined control response time may be determined as the waiting time for the wind turbine executing the feedforward control.

The feedforward control module 40 may perform the feedforward control on the wind turbine in following steps: determining a target wind speed at a current moment when the waiting time is reached, determining a control strategy corresponding to the target wind speed at the current moment, and controlling the wind turbine to execute the determined control strategy.

Wind speeds and control strategies corresponding to the wind speeds may be stored in a control strategy table. In this case, the feedforward control module 40 may search out a control strategy corresponding to the target wind speed at the current moment, from the control strategy table.

In an embodiment, in the feedforward control device for the wind turbine according to an exemplary embodiment of this application, in addition to the target wind speed that is not affected by the inductive effect, a target wind direction, target turbulence intensity, and a target wind shear factor that are not affected by the inductive effect may also be obtained.

In this case, the feedforward control device for the wind turbine according to an exemplary embodiment of this application further includes a target parameter determination module (not shown in figures) configured to determine a target wind shear factor, a target wind direction, and/or target turbulence intensity based on the inflow wind information at multiple spatial point positions.

In this case, when the waiting time is reached, the feedforward control module 40 is further configured to determine the target wind shear factor, the target wind direction and/or the target turbulence intensity at the current moment, in addition to determining the target wind speed at the current moment. At this time, the control strategy executed by the wind turbine may correspond to the target wind speed and at least one of the target wind shear factor, the target wind direction and the target turbulence intensity at the current moment.

In this case, wind resource parameters and control strategies corresponding to the wind resource parameters may be stored into the control strategy table. The wind resource parameters include the wind speed, and at least one of a wind shear factor, a wind direction and turbulence intensity.

In an embodiment, the inflow wind information at multiple spatial point positions obtained by the inflow wind information acquisition module 10 may include first inflow wind information and second inflow wind information. For example, the first inflow wind information may include inflow wind information at each spatial point position above a plane where a centerline of beams emitted by the remote sensing measurement device is located. The second inflow wind information may include inflow wind information at each spatial point position below the plane where the centerline of the beams emitted by the remote sensing measurement device is located.

A process for determining the target wind shear factor, a process for determining the target wind direction, and a process for determining the target turbulence intensity are described hereinafter.

The target parameter determination module may calculate the target wind shear factor in the following ways.

For example, the target parameter determination module is configured to: obtain a first synthesized wind speed by synthesizing the first inflow wind information; obtain a second synthesized wind speed by synthesizing the second inflow wind information; calculate an average value of heights of multiple spatial points above the plane where the centerline of the beams emitted by the remote sensing measurement device is located, to obtain a first height; calculate an average value of heights of multiple spatial points below the plane where the centerline of the beams emitted by the remote sensing measurement device is located, to obtain a second height; and calculate the target wind shear factor according to the first synthesized wind speed, the second synthesized wind speed, the first height and the second height.

The target parameter determination module may determine the target wind direction in the following ways.

For example, the target parameter determination module is configured to: calculate a horizontal wind direction of the inflow wind according to the first inflow wind information, the second inflow wind information, and a zenith angle of each beam emitted by the remote sensing measurement device; calculate a vertical wind direction of the inflow wind according to the first inflow wind information, the second inflow wind information, the zenith angle of each beam emitted by the remote sensing measurement device, an azimuth angle of each beam emitted by the remote sensing measurement device relative to a plane where the centerline of the beams is located; and determine an angle between the horizontal wind direction and the vertical wind direction of the inflow wind as the target wind direction.

The target parameter determination module may determine the target turbulence intensity in the following ways.

For example, the target parameter determination module is configured to: synthesize a target wind speed by the inflow wind information; calculate a wind speed standard deviation of the target wind speed within a predetermined time period, and an average wind speed of the target wind speed within the predetermined time period; and determining a ratio of the wind speed standard deviation to the average wind speed as the target turbulence intensity.

Figure 10:
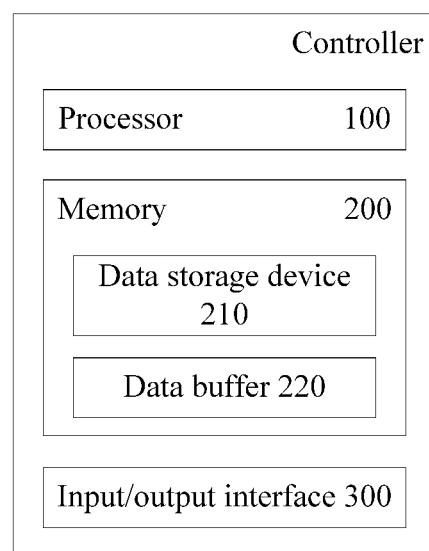
FIG. 10 is a block diagram of a control system of a wind turbine according to an exemplary embodiment of this application.

FIG. 10 is a block diagram of a control system of a wind turbine according to an exemplary embodiment of this application.

As shown in FIG. 10, the controller of a wind turbine according to the embodiment of this application includes: a processor 100, a memory 200 for storing a computer program, and an input/output interface 300. The computer program, when executed by the processor, the aforementioned feedforward control method for the wind turbine is implemented. The input/output interface 300 is configured to connect to various input/output devices. The controller may be a main controller inside the wind turbine, or a sub-controller that interacts with the main controller. In an embodiment, the controller may be arranged in a centralized control system of a wind farm, and is configured to send instructions to all wind turbines in the wind farm. The instructions include control instructions or operation scheduling instructions from the power grid.

The feedforward control method for the wind turbine shown in FIG. 1 may be executed in the processor 100 shown in FIG. 10. In other words, the modules shown in FIG. 9 may be implemented by a general-purpose hardware processor such as a digital signal processor, field programmable gate arrays, etc. Alternatively, the modules shown in FIG. 9 may also be implemented by a dedicated hardware processor such as a dedicated chip, or be implemented entirely through computer programs. For example, it may be implemented as various modules in the processor 100 shown in FIG. 10.

In an embodiment, the memory 200 according to an exemplary embodiment of this application may include: a data storage device 210 for storing inflow wind information at multiple spatial point positions acquired from a remote sensing measurement device. As an example, the data storage device 210 may be various types of storage units capable of storing data for a long time.

After the processor 100 obtains the inflow wind information at multiple spatial point positions from the remote sensing measurement device, it stores the inflow wind information in the data storage device 210. In addition, the processor 100 may also store a target wind speed, a target wind direction, a target wind shear factor, and target turbulence intensity in the data storage device 210.

Optionally, a control strategy table can be stored in the processor 100. In a determination process of the control strategy, directly local search can increase the processing speed. The control strategy table may also be stored in other memory besides the processor, which is not limited by this application. For example, the control strategy table may be stored in the data storage device 210. The data storage device 210 reads and searches the control strategy table when the processor 100 determines a control strategy, which can reduce the storage burden of the processor.

In an embodiment, the memory 200 according to an exemplary embodiment of this application may further include: a data buffer 220. The data buffer 220 is a storage unit with a fixed storage capacity, and only stores input data from the current time to a certain time duration before the current time. With continuous input of later data, the data stored earlier will be automatically overwritten.

As an example, the data buffer 220 may be various memories capable of storing data for a short time period for the processor 100.

In an exemplary embodiment of this application, the target wind speed, target wind direction, target wind shear factor, and target turbulence intensity obtained by the processor 100 may be stored in the data storage device 210 or in the data buffer 220 as well.

In this case, when the waiting time is reached, the processor 100 is configured to search the data buffer 220 for the target wind speed (or other wind resource parameters) calculated at the current moment (the moment when the waiting time is reached), and search out a control strategy matching the target wind speed from the control strategy table, to control the wind turbine.

A control system of a wind turbine is also provided according to an embodiment of this application. The control system includes a remote sensing measurement device and a controller.

Specifically, the remote sensing measurement device is configured to detect inflow wind information at multiple spatial point positions in front of the wind turbine. The multiple spatial point positions are distributed in multiple different cross-sections, and the multiple different cross-sections have different distances to the wind turbine.

In an embodiment, the remote sensing measurement device may be set on the top of a nacelle of the wind turbine. As an example, the remote sensing measurement device may include, but is not limited to, a lidar.

The controller is configured to obtain the inflow wind information at multiple of spatial point positions from the remote sensing measurement device, to realize the aforementioned feedforward control method for the wind turbine.

A computer-readable storage medium stored with a computer program is provided according to an exemplary embodiment of this application. The computer program stored in the computer-readable storage medium, when executed by the processor, causes the processor to execute the aforementioned feedforward control method for a wind turbine. The computer-readable recording medium may be any data storage device that can store data read by a computer system, such as a read-only memory, a random access memory, a read-only optical disk, a magnetic tape, a floppy disk, an optical data storage device, and a carrier wave (such as data transmission through the Internet via a wired or wireless transmission path).

According to the feedforward control method and device for the wind turbine, and the control system thereof according to the exemplary embodiments of this application, the wind speed of the inflow wind that is not affected by the induction effect is obtained through an effective wind speed synthesis method, which avoids the problem of inaccuracy measurement of wind speed by the existing wind measuring device.

In addition, according to the feedforward control method and device for the wind turbine, and the control system thereof according to the exemplary embodiments of this application, influence of the inductive effect is effectively eliminated, and the wind speed, wind direction, turbulence intensity and wind shear factor of the inflow wind that are not affected by the inductive effect are obtained, therefore finally realizing accurate power generation assessment and control of the wind turbine, and minimizing the load caused by uncertainty of the inflow wind of the wind turbine.

Furthermore, according to the feedforward control method and device for the wind turbine, and the control system thereof according to the exemplary embodiments of this application, the wind speed is obtained by synthesizing the inflow wind information at multiple spatial point positions, thus the wind speed of the inflow wind obtained is more accurate compared with a wind speed obtained by a currently widely used way of measuring wind speed at a single point in space that is affected by the inductive effect.

The technical solutions of this application have been shown and described with reference to the embodiments. Those skilled in the art should understand that various modifications and changes can be made to these embodiments without departing from the spirit and scope of this application as defined by the claims.

The invention claimed is:

1. A feedforward control method for a wind turbine, comprising:
obtaining inflow wind information of inflow wind at a plurality of spatial point positions in front of the wind turbine through a remote sensing measurement device, wherein the plurality of spatial point positions are distributed in a plurality of different cross-sections, and the plurality of different cross-sections have different distances to the wind turbine;
synthesizing the obtained inflow wind information into a target wind speed;
predicting an incoming flow arrival time when the inflow wind from a target point reaches an impeller plane, based on the synthesized target wind speed; and
performing a feedforward control on the wind turbine according to the predicted incoming flow arrival time,
wherein the synthesizing the obtained inflow wind information into a target wind speed comprises:
determining respectively an average wind speed of each cross-section of the inflow wind according to the inflow wind information at the plurality of spatial point positions of each cross-section;
determining inductive effect influence coefficients corresponding to respective cross-sections of the plurality of different cross-sections; and
obtaining the target wind speed based on the average wind speeds of all cross-sections and the inductive effect influence coefficients of respective cross-sections.

2. The feedforward control method according to claim 1, wherein the determining inductive effect influence coefficients corresponding to respective cross-sections comprises:
selecting one cross-section from all cross-sections of the plurality of different cross-sections as a reference cross-section;
setting a first inductive effect influence coefficient of the reference cross-section; and
obtaining inductive effect influence coefficients of the cross-sections apart from the reference cross-section, based on the first inductive effect influence coefficient of the reference cross-section and distances between the cross-sections apart from the reference cross-section in all cross-sections and the reference cross-section.

3. The feedforward control method according to claim 1, wherein the obtaining the target wind speed according to the average wind speeds of all cross-sections and inductive effect influence coefficients of respective cross-sections comprises:
setting weights corresponding to the respective cross-sections;
calculating quotients of the average wind speeds of the respective cross-sections to the inductive effect influence coefficients corresponding to the respective cross-sections; and
determining a weighted sum of the quotients corresponding to the respective cross-sections using the weights corresponding to the respective cross-sections as the target wind speed.

4. The feedforward control method according to claim 1, wherein the obtaining the target wind speed based on average wind speeds of all cross-sections comprises:
obtaining an intermediate wind speed by synthesizing the average wind speeds of all cross-sections, to eliminate time-phase differences among the cross-section average wind speeds of all cross-sections; and
obtaining the target wind speed according to the intermediate wind speed and a given inductive effect influence coefficient; and
wherein the given inductive effect influence coefficient is determined by:
setting weights for respective cross-sections of the plurality of different cross-sections;
determining inductive effect influence coefficients corresponding to the respective cross-sections; and
calculating a weighted sum of the inductive effect influence coefficients corresponding to the respective cross-sections using the weights for the respective cross-sections, and determining the weighted sum as the given inductive effect influence coefficient.

5. The feedforward control method according to claim 4, wherein the obtaining an intermediate wind speed by synthesizing cross-section average wind speeds of all cross-sections comprises:
for each cross-section, determining an estimated wind speed when the inflow wind reaches the designated cross-section from the cross-section according to a distance from the cross-section to the designated cross-section and the cross-section average wind speed of the cross-section, and
determining an average value of all estimated wind speeds as the intermediate wind speed.

6. The feedforward control method according to claim 5, wherein the estimated wind speed when the inflow wind reaches the designated cross-section from the cross-section is determined by:
calculating a flowing time required for the inflow wind to flow from the cross-section to the designated cross-section according to the distance from the cross-section to the designated cross-section and the cross-section average wind speed of the cross-section; and
determining a designated average wind speed of the designated cross-section after the flowing time as the estimated wind speed when the inflow wind flows from the cross-section to the designated cross-section.

7. The feedforward control method according to claim 1, wherein the remote sensing measurement device comprises a lidar.

8. The feedforward control method according to claim 7, wherein the synthesizing the obtained inflow wind information into a target wind speed comprises:
for each beam emitted by the lidar, determining a beam synthesized wind speed of the beam according to the inflow wind information at the plurality of spatial point positions on the beam and inductive effect influence coefficients corresponding to the plurality of spatial point positions; and
determining an average value of beam synthesized wind speeds of all beams as the target wind speed.

9. The feedforward control method according to claim 8, wherein the beam synthesized wind speed of the beam is determined by:
setting a weight for each spatial point position;
calculating a quotient of inflow wind information at each spatial point position on the beam to a corresponding inductive effect influence coefficient; and determining a weighted sum of the quotients using the corresponding weights, and determining the weighted sum as the beam synthesized wind speed of the beam.

10. The feedforward control method according to claim 1, wherein predicting an incoming flow arrival time when inflow wind from a target point reaches an impeller plane, based on the synthesized target wind speed comprises:
   determining a distance from a position of the target point to the impeller plane; and
   determining a quotient of the distance to the synthesized target wind speed, as the incoming flow arrival time.

11. The feedforward control method according to claim 1, wherein the synthesizing the obtained inflow wind information into a target wind speed comprises:
   obtaining a wind speed curve of the inflow wind flowing from the target point to the impeller plane according to the obtained inflow wind information at the plurality of spatial point positions; and
   integrating the obtained wind speed curve, calculating a ratio of an integral area to a distance between the target point and the impeller plane, and determining the ratio as the target wind speed, and
   wherein the predicting an incoming flow arrival time when inflow wind from a target point reaches an impeller plane, based on the synthesized target wind speed comprises:
   determining a ratio of the integral area to the target wind speed, as the incoming flow arrival time when inflow wind from the target point reaches the impeller plane.

12. The feedforward control method according to claim 1, wherein the predicting an incoming flow arrival time when inflow wind from a target point reaches an impeller plane, based on the synthesized target wind speed comprises:
   determining an incoming flow arrival time corresponding to the target wind speed according to a correspondence relationship between target wind speeds and incoming flow arrival times; and
   determining the incoming flow arrival time as the incoming flow arrival time when the inflow wind from the target point reaches the impeller plane.

13. The feedforward control method according to claim 1, wherein the predicting an incoming flow arrival time when inflow wind from a target point reaches an impeller plane, based on the synthesized target wind speed comprises:
   determining a first flowing time required for the inflow wind to flow from a predetermined cross-section to a designated cross-section;
   determining a second flowing time required for the inflow wind to flow from the designated cross-section to the impeller plane;
   obtaining the incoming flow arrival time when the inflow wind from the target point reaches the impeller plane, according to the determined first flowing time and the determined second flowing time.

14. The feedforward control method according to claim 13, wherein the predicting an incoming flow arrival time when inflow wind from a target point reaches an impeller plane, based on the synthesized target wind speed comprises:
   determining a third flowing time required for the inflow wind to flow from the target point to the farthest detection distance, in a case that a location of the target point is greater than the farthest detection distance of the remote sensing measurement device; and
   obtaining the incoming flow arrival time when the inflow wind from the target point reaches the impeller plane, based on the first flowing time, the second flowing time, and the third flowing time.

15. The feedforward control method according to claim 1, wherein the performing a feedforward control on the wind turbine according to the predicted incoming flow arrival time comprises:
   determining a control response time for the wind turbine performing a feedforward control;
   determining a waiting time for the wind turbine performing the feedforward control according to the predicted incoming flow arrival time and the control response time; and
   performing the feedforward control on the wind turbine when the determined waiting time is reached.

16. The feedforward control method according to claim 15, wherein the waiting time for the wind turbine performing the feedforward control is a difference between the predicted incoming flow arrival time and the control response time.

17. The feedforward control method according to claim 15, wherein performing the feedforward control on the wind turbine when the determined waiting time is reached comprises:
   determining a target wind speed at a current moment when the waiting time is reached;
   determining a control strategy corresponding to the target wind speed at the current moment; and
   controlling the wind turbine to execute the determined control strategy.

18. The feedforward control method according to claim 17, wherein determining a control strategy corresponding to the target wind speed at the current moment comprises:
   searching out the control strategy corresponding to the target wind speed at the current moment from a control strategy table, wherein wind speeds and control strategies corresponding to the wind speeds are stored into the control strategy table.

19. The feedforward control method according to claim 17, further comprising:
   determining at least a target wind shear factor, a target wind direction, or target turbulence intensity, based on the obtained inflow wind information at the plurality of spatial point positions,
   wherein performing the feedforward control on the wind turbine when the determined waiting time is reached further comprises; determining at least the target wind shear factor, the target wind direction, or the target turbulence intensity at the current moment, and
   wherein the determined control strategy corresponds to the target wind speed, and further corresponds to at least one of the target wind shear factor, the target wind direction and the target turbulence intensity at the current moment.

20. The feedforward control method according to claim 19, wherein the obtained inflow wind information comprises first inflow wind information and second inflow wind information;
   the first inflow wind information comprises inflow wind information at each spatial point position above a plane where a centerline of beams emitted by the remote sensing measurement device is located, and the second inflow wind information comprises inflow wind information at each spatial point position below the plane where the centerline of the beams emitted by the remote sensing measurement device is located;
   wherein the determining the target wind shear factor comprises:

synthesizing the first inflow wind information to obtain a first synthesized wind speed;

synthesizing the second inflow wind information to obtain a second synthesized wind speed;

calculating an average value of heights of the plurality of spatial point positions above the plane where the centerline of the beams emitted by the remote sensing measurement device is located, to obtain a first height;

calculating an average value of heights of the plurality of spatial point positions below the plane where the centerline of the beams emitted by the remote sensing measurement device is located, to obtain a second height; and calculating the target wind shear factor according to the first synthesized wind speed, the second synthesized wind speed, the first height and the second height.

21. The feedforward control method according to claim 20, wherein the determining the target wind direction comprises:

calculating a horizontal wind direction of the inflow wind according to the first inflow wind information, the second inflow wind information, and a zenith angle of each beam emitted by the remote sensing measurement device;

calculating a vertical wind direction of the inflow wind according to the first inflow wind information, the second inflow wind information, the zenith angle of each beam emitted by the remote sensing measurement device, and an azimuth angle of each beam emitted by the remote sensing measurement device relative to the plane where the centerline of the beams is located; and determining an angle between the horizontal wind direction and the vertical wind direction of the inflow wind, as the target wind direction.

22. The feedforward control method according to claim 19, wherein the determining the target turbulence intensity comprises:

calculating a wind speed standard deviation of the target wind speed within a predetermined time period and an average wind speed of the target wind speed within the predetermined time period; and determining a quotient of the wind speed standard deviation to the average wind speed, as the target turbulence intensity.

23. A controller of a wind turbine, comprising:
a processor;
an input/output interface;
a memory configured to store a computer program; and
the processor is configured to execute the computer program to:
obtain inflow wind information of inflow wind at a plurality of spatial point positions in front of the wind turbine through a remote sensing measurement device, wherein the plurality of spatial point positions are distributed in a plurality of different cross-sections, and the plurality of different cross-sections have different distances to the wind turbine;
synthesize the obtained inflow wind information into a target wind speed by:
determining respectively an average wind speed of each cross-section of the inflow wind according to the inflow wind information at the plurality of spatial point positions of each cross-section;
determining inductive effect influence coefficients corresponding to respective cross-sections of the plurality of different cross-sections; and
obtaining the target wind speed based on the average wind speeds of all cross-sections and the inductive effect influence coefficients of respective cross-sections;
predict an incoming flow arrival time when the inflow wind from a target point reaches an impeller plane, based on the synthesized target wind speed; and
perform a feedforward control on the wind turbine according to the predicted incoming flow arrival time, wherein the feedforward control on the wind turbine comprises at least one of a yaw control, a pitch control, a load reduction control, a shutdown control, and a torque adjustment control of the wind turbine.

24. A control system of a wind turbine, comprising:
a remote sensing measurement device configured to detect inflow wind information of inflow wind at a plurality of spatial point positions in front of the wind turbine, wherein the plurality of spatial point positions are distributed in a plurality of different cross-sections, and the plurality of different cross-sections have different distance to the wind turbine, and
a controller configured to obtain the inflow wind information at the plurality of spatial point positions from the remote sensing measurement device, to synthesize the obtained inflow wind information into a target wind speed; predict an incoming flow arrival time when the inflow wind from a target point reaches an impeller plane, based on the synthesized target wind speed, and perform a feedforward control on the wind turbine according to the predicted incoming flow arrival time,
wherein the controller is configured to:
determine respectively an average wind speed of each cross-section of the inflow wind according to the inflow wind information at the plurality of spatial point positions of each cross-section;
determine inductive effect influence coefficients corresponding to respective cross-sections of the plurality of different cross-sections; and
obtain the target wind speed based on the average wind speeds of all cross-sections and the inductive effect influence coefficients of respective cross-sections.

25. A non-transitory computer-readable storage medium stored with a computer program, wherein the computer program, when executed by a processor, implements a feedforward control method for a wind turbine comprising:
obtaining inflow wind information of inflow wind at a plurality of spatial point positions in front of the wind turbine through a remote sensing measurement device, wherein the plurality of spatial point positions are distributed in a plurality of different cross-sections, and the plurality of different cross-sections have different distances to the wind turbine;
synthesizing the obtained inflow wind information into a target wind speed;
predicting an incoming flow arrival time when the inflow wind from a target point reaches an impeller plane, based on the synthesized target wind speed; and
performing a feedforward control on the wind turbine according to the predicted incoming flow arrival time, wherein the feedforward control on the wind turbine comprises at least one of a yaw control, a pitch control, a load reduction control, a shutdown control, and a torque adjustment control of the wind turbine,
wherein the synthesizing the obtained inflow wind information into a target wind speed comprises:

determining respectively an average wind speed of each cross-section of the inflow wind according to the inflow wind information at the plurality of spatial point positions of each cross-section;

determining inductive effect influence coefficients corresponding to respective cross-sections of the plurality of different cross-sections; and obtaining the target wind speed based on the average wind speeds of all cross-sections and the inductive effect influence coefficients of respective cross-sections.

\* \* \* \* \*